United States Patent [19]

Minniear

[11] 4,049,230
[45] Sept. 20, 1977

[54] BRACKET DEVICE

[76] Inventor: Carl E. Minniear, Dingman Slagel Road., R.R. No. 5, Sidney, Ohio 45365

[21] Appl. No.: 656,013

[22] Filed: Feb. 6, 1976

[51] Int. Cl.² ............................................. F16M 13/00
[52] U.S. Cl. .................................. 248/539; 248/226.2; 248/222.1; 403/240
[58] Field of Search ........... 248/223, 224, 225, 226 C, 248/239, 539, 73; 403/239, 240, 252

[56] References Cited
U.S. PATENT DOCUMENTS

| | | | |
|---|---|---|---|
| 2,891,755 | 6/1959 | Clark | 248/220.5 |
| 3,001,755 | 9/1961 | Doyle | 248/223 X |
| 3,015,177 | 1/1962 | Hembd et al. | 248/223 X |
| 3,178,139 | 4/1965 | McFarlin | 248/539 |
| 3,463,431 | 8/1969 | Matson | 248/224 |
| 3,522,921 | 8/1970 | Lytle | 248/73 X |

Primary Examiner—William H. Schultz
Attorney, Agent, or Firm—Jerome P. Bloom

[57] ABSTRACT

A bracket providing an auxiliary support adapted for easy connection to or removal from a base structure having an opening opposite edge portions of which may serve as mounting means for the bracket.

The bracket illustrated comprises a plurality of arm elements having a common pivot. One portion of the arm elements is adapted to serve as a support for an object to be appropriately mounted with reference to said base structure. Other portions of said arm elements provide two anchoring means the projected ends of which may be inserted in the opening in the base structure. Means are provided to induce a scissors-like spread of the inserted arm elements, to cause remote surface portions thereof to firmly engage said opposite edge portions of said opening, and to fix said arm elements in a predetermined relation to each other and to the base structure to which the bracket is mounted.

13 Claims, 4 Drawing Figures

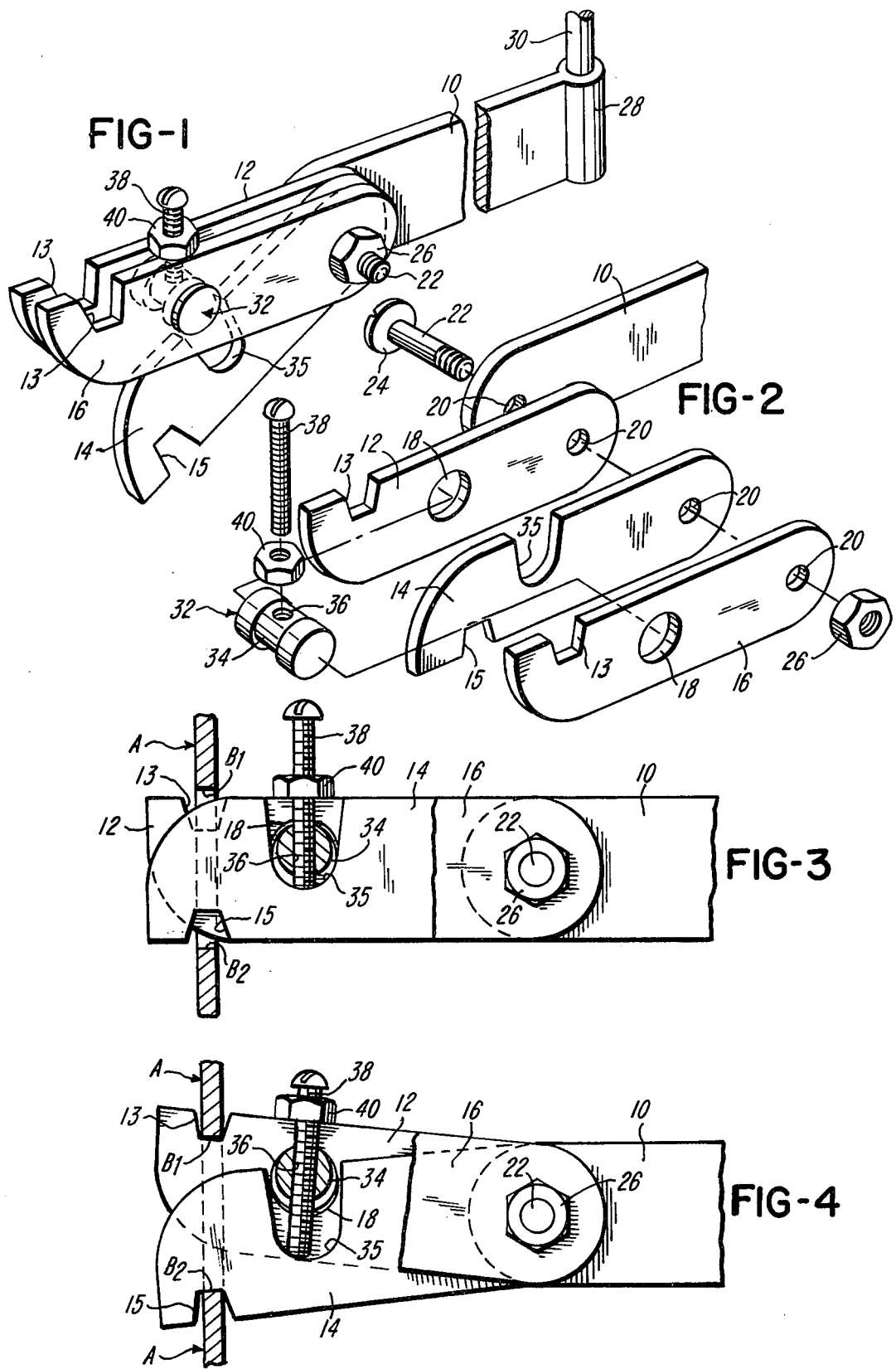

BRACKET DEVICE

BACKGROUND OF THE INVENTION

This invention relates to improvements in bracket type auxiliary support structures and, more particularly, to a bracket designed for application to a base structure having an opening opposite edge portions of which may serve as a mounting means for the bracket. As herein illustrated the bracket serves to mount an antenna on an automotive vehicle. However its application and use is obviously not so limited, nor is such limitation as to use intended.

The objective and achievement of the invention is to provide means enabling a simplified mount of an object such as a Citizens Band radio antenna on an automotive vehicle. Under normal conditions the mount of such an object has been difficult, often requiring special tools and in most instances a defacing of the base structure to which the object must be mounted. Moreover, as such devices have been mounted in the prior art, the removal thereof in conjunction with their auxiliary support has been extremely difficult and/or has produced a further defacing of the base structure to which it has been mounted. This last mentioned difficulty has been eliminated by the present invention.

A principal achievement of the present invention is that it enables anyone to easily, simply and quickly install an antenna or like object without need for previous experience or particular manual dexterity, under conditions that have heretofore demanded special knowledge or skill or required special equipment.

SUMMARY OF THE INVENTION

This invention provides a simple bracket a preferred embodiment of which includes a headed bolt having a threadedly engaged nut. The bolt serves as a common pivot for a plurality of arm-like elements mounted thereby for pivotal movement in essentially side by side parallel planes, intermediate the head of the bolt and its threadedly engaged nut.

In the form illustrated, one of the arm-like elements is designed to receive and mount an antenna. Other of the arm-like elements serve as two anchoring means which in a free pivoting condition may be inserted between opposite edge portions of an opening in a base structure to which the bracket must be applied. One of the anchoring means is shown to comprise a pair of arm elements which are transversely spaced by means of a further arm element which forms the other of the anchoring means. There is no connection between said anchoring means other than by means of the bolt to which they commonly mount. However the pair of transversely spaced arm elements which form one anchoring means include transversely aligned apertures in which is inserted a rotatable and relatively movable pin. The pin so disposed forms a bridge between said pair of transversely spaced arm elements and has a tapped opening intermediate its ends accommodating a threadedly engaged screw.

Upon insertion of the arm-like elements which form said anchoring means between opposite edge portions of an opening in a base structure such as provided in a bumper or other body portion of an automotive vehicle, the screw may be turned to project further in the direction of the single arm-like element forming said other of said anchoring means to bias against the same, producing a scissors-like spread of the arm elements of the anchoring means to fix them against opposite edge portions of the opening defined in the base structure, to which the bracket is applied.

A primary object and achievement of the invention is a bracket which is simple and economical to fabricate, more efficient and satisfactory in use, adaptable to a variety of applications and unlikely to malfunction.

Another object of the invention is to facilitate the mounting of a bracket constituting an auxiliary support to means defining an opening in a base structure to which the bracket must be applied.

A further object of the invention is to provide a bracket embodying the total means required for its application to means defining an opening in a base structure to which the bracket must be applied utilizing anchoring means the engagement of which is achieved by their scissors-like spread.

Another object of the invention is to provide a bracket enabling any individual, without previous experience, to simply, easily and quickly mount a radio antenna or other object under conditions that would be relatively difficult using equipment previously available for such purposes.

An additional object of the invention is to provide a bracket possessing the advantageous structural features, the inherent meritorious characteristics and means and mode of use herein described or apparent therefrom.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein is shown one but not the only embodiment and application of the invention, FIG. 1 is a perspective view of a preferred embodiment of the invention;

FIG. 2 is an exploded view of the apparatus of FIG. 1;

FIG. 3 is a fragment of a sectional view illustrating the application of the bracket of FIGS. 1 and 2 to means defining an opening in the base structure to which the bracket must be mounted, and FIG. 4 is a view similar to that of FIG. 3 showing the bracket in a securely mounted condition.

Like parts are indicated by similar characters of reference throughout the several views.

The embodiment of the invention illustrated in the drawings comprises a bracket device providing an auxiliary support adapted for easy connection to or removal from a base structure characterized by an opening opposite edge portions of which may serve as a mounting means for the bracket. As shown, the bracket is being used to mount an antenna for a Citizens Band radio which has been incorporated in an automotive vehicle.

The bracket device constituting a preferred embodiment of the invention comprises four plate-like arm elements 10, 12, 14 and 16 each of which is formed to include an aperture 20 in an area thereof which is in an adjacent spaced relation to one end. The apertures 20 accommodate the projection therethrough of the body of a bolt element 22. The latter provides a common pivot about which the arm elements may be pivotally adjusted, as and when needs require. As so mounted, the arm elements 10, 12, 14 and 16 are laterally contained by

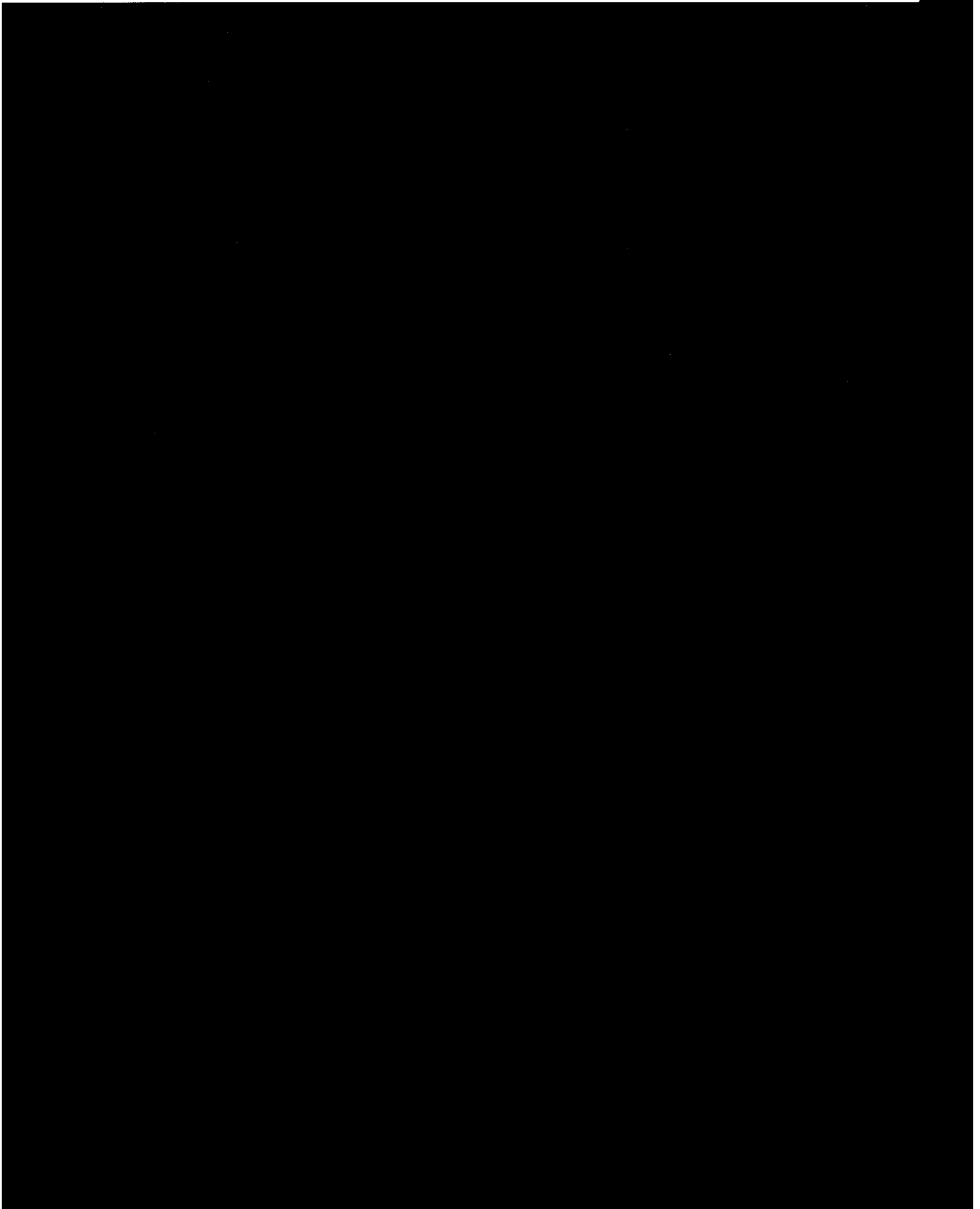

element 32. The motion of the screw is continued in this sense until the projected extremity thereof engages and bears on the means defining the arcuate base portion of the notch 35 in the arm 14. Further rotation of the screw causes body portion 34 of the pin element 32 to bear reactantly against the upper edge portions of the means defining the apertures 18 in the respective arm elements 12 and 16. In this way one produces oppositely directed forces which induce, in turn, a scissors-like spread of the respective anchoring means provided on the one hand by the coupled arm elements 12 and 16 and on the other hand by the arm element 14. It is to be noted that in the insertion of the side by side, transversely aligned arm elements in the opening of the bumper A that they will normally be clamped in light frictional engagement by appropriate adjustment of the nut 26. This prevents a looseness of the arm 14 with reference to its positioning in respect to the arm elements 12 and 16 which would otherwise occur prematurely. Further, in the lightly held frictional connection between the arm elements they are conditioned to readily permit the scissors-like spread of the two anchoring means so provided. In any event, the spreading of the paired arm elements 12 and 16 with reference to the arm element 14 will cause the respective notched portions 13 and 15 thereof to move to and nest and be wedged against the surface portions $B_1$ and $B_2$ defining the vertical extremities of the opening in the bumper A. As the screw is turned to effect this wedged engagement of the notched portions of the anchoring means to the base structure, resistance will be encountered to the turning of the screw which indicates the bracket device is securely locked to the support, whereupon the nut 40 will be turned down to seat firmly on the upper edges of the arm elements 12 and 16. A reactant force so generated and applied to the threads of screw 38 locks the screw against unintended rotation as might result from vibration or the like. With the anchoring means provided by the arm elements 12, 14 and 16 spread and locked in place, the nut 26 is turned to lock the arm elements one on the other and against the arm element 10 constituting the mounting device for the antenna 30. Of course, the antenna 30 may be applied at any appropriate time and in various manner believed obvious, as previously noted.

From the foregoing it will be seen that the removal of the bracket device is even easier than its application. All one need do is to retract the nut 40 from the arm elements 12 and 16 and turn the screw 38 in a sense oppositely of that before described. Once this is done, the nut 26 may be slightly backed off sufficiently that one can collapse the anchoring means, one upon the other, to position in transversely aligned relation, whereupon the bracket device may be withdrawn from the bumper.

It will be seen from the foregoing that the mounting or removal of the bracket device of the invention may be achieved by simple means which are readily available. In no event does the apparatus require any complex manipulation or any extreme effort in the application or removal thereof.

Particular attention is directed to the fact that in the spreading of the anchoring means the design of the pin-like member 32 to permit its free rotation and slight relative movement in the apertures 18 enables the pin element to adjust to the changing positions of angularity of the anchoring means constituted by the arm elements 12 and 16 on the one hand and the arm element 14 on the other hand. This ability to change and shift insures that the thrust of the screw 38 will be optimally directed at all times to remain essentially perpendicular to the surface provided in opposition thereto by the edge portion of the arm 14 which defines the notch 35. By the same token, the nut 40 will seat squarely and firmly, at all times to the upper edge portions of the upper anchoring means constituted by the coupled arm elements 12 and 16. It will be seen, of course, that the diameter of the screw 38 as it extends between the adjacent sides of the arm elements 12 and 16 will be such to prevent axial displacement of the pin-like element 32, once the assembly of the pin 32, the screw 38 and the nut 40 is applied to form part of the anchoring means constituted by the arm elements 12 and 16.

It will of course be obvious that the procedure in use of the embodiment of the invention illustrated or any comparable embodiment may be varied to suit a person's inclination. The description of the use and application of the bracket device as here described is only exemplary and is in no event to be construed as limiting.

Further, there may be obvious modifications in the structure illustrated without departing from the concept of the invention. For example, the arm elements 12 and 16 may be originally formed as a unitary structure and in fact it is obvious, while not preferred, that rather than being comprised of two arm elements 12 and 16 the anchoring means constituted thereby may utilize only a single arm element while appropriate provision is made for the limited positioning of the screw element 38.

An interesting feature of the preferred embodiment illustrated is that the arm element 14 is unrelated to the arm elements 12 and 16 except by way of the common pivot. This insures that a person using the bracket device will properly position the arm element 14 in the application of the bracket device in a manner to insure an absolute coupling and locking the device in connection with the means defining the opening in the base structure to which the bracket device is applied.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Bracket apparatus comprising at least two anchoring means pivotally mounted to adapt their projected end portions to be disposed in an opening between opposite edge portions of a base structure to which the bracket is intended to mount, means for inducing a scissors-like spread of said anchoring means to have remote portions thereof engage to the said opposite edge portions of said base structure, means defining a mounting device interconnected with said anchoring means and adapted to be supported thereby and in a like means to normally dispose free of and in a sense transverse to the other of said two arm-like means, said laterally extending means mounting in connection therewith means adapted to be variably projected therefrom to apply pressure to said other of said two arm-like means when ends of said two arm-like means remote from their pivotal connection are disposed in an opening between opposite edge portions of a base structure to which the bracket is intended to mount whereby to cause said arm-like means to be spread and forced into clamping engagement with said opposite edge portions between which they are disposed, said variably projectible means being a screw-like device which is threadedly engaged with said laterally extending means and arranged to be projected therethrough to engage with and apply pressure to said other of said arm-like means.

10. Bracket apparatus as in claim 9 wherein at least said other of said arm-like means has a plate-like form and is mounted to dispose in a plane commonly occupied by said screw-like device.

11. Bracket apparatus as in claim 10 wherein said other of said arm-like means has a notch in the sruface thereof adjacent an end of said screw-like device, a means defining the inner extremity of which notch has an arcuate form providing for said screw-like device to be advanced to bear and variably locate thereon, along the length thereof, in accordance with the relative positions of said arm-like means in the lock thereof in an opening in the base structure to which the bracket is mounted.

12. Bracket apparatus as in claim 2 wherein said other of said arm-like means is comprised of a single plate-like arm member positioned between a pair of additional arm members of which said one arm-like means is comprised, said additional arm members having aligned apertures to accommodate end portions of said laterally extending means, accommodated in said aperatures to provide freedom of relative rotary motion of said laterally extending means, and said means mounting in connection with said laterally extending means is a screw device which may be thrust therethrough, in threaded engagement therewith, and variably projected therefrom to dispose in an edge portion of said arm element of which said other of said arm-like means is comprised, to spread said arm-like means to lock the same against opposite edge portions of an opening in a base structure, and means threadedly engged with the screw device to be positioned thereon and adjusted to maintain a locked relation of said arm-like means to said base structure.

13. Bracket apparatus as in claim 12 characterized by remote edge portions of said arm-like means having notches to accommodate therein opposite edge portions of means defining an opening in a base structure to which the bracket apparatus is applied.

* * * * *

UNITED STATES PATENT AND TRADEMARK OFFICE
CERTIFICATE OF CORRECTION

PATENT NO. : 4,049,230

DATED : September 20, 1977

INVENTOR(S) : Carl E. Minniear

It is certified that error appears in the above-identified patent and that said Letters Patent are hereby corrected as shown below:

Col. 3, line 15, "sensee" is corrected to read -- sense --.

Col. 7, line 32 (Claim 2, line 18) "end" is corrected to read -- ends --.

Col. 7, line 48 (Claim 3, line 9) "mean" is corrected to read -- means --.

Col. 9, line 22 (Claim 11, line 2) "sruface" is corrected to read -- surface --.

Col. 10, line 19 (Claim 12, line 17) "threadedly engged" is corrected to read -- threadedly engaged --.

Signed and Sealed this

Twenty-seventh Day of December 1977

[SEAL]

Attest:

RUTH C. MASON
Attesting Officer

LUTRELLE F. PARKER
Acting Commissioner of Patents and Trademarks